(12) United States Patent
Chen et al.

(10) Patent No.: US 9,572,114 B2
(45) Date of Patent: Feb. 14, 2017

(54) CHANNEL MAP GENERATION METHOD AND APPARATUS THEREFOR

(71) Applicant: Realtek Semiconductor Corp., HsinChu (TW)

(72) Inventors: Yan-Yu Chen, Changhua County (TW); Chung-Yao Chang, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 144 days.

(21) Appl. No.: 14/139,813

(22) Filed: Dec. 23, 2013

(65) Prior Publication Data

US 2015/0009904 A1 Jan. 8, 2015

(30) Foreign Application Priority Data

Jul. 2, 2013 (TW) .............................. 102123659 A (51) Int. Cl.
| | |
|---|---|
| *H04B 17/309* | (2015.01) |
| *H04W 52/24* | (2009.01) |
| *H04B 17/23* | (2015.01) |
| *H04B 17/318* | (2015.01) |
| *H04B 17/373* | (2015.01) |

(52) U.S. Cl.
CPC ........... *H04W 52/243* (2013.01); *H04B 17/23* (2015.01); *H04B 17/318* (2015.01); *H04B 17/373* (2015.01)

(58) Field of Classification Search
None
See application file for complete search history.

(56) References Cited

U.S. PATENT DOCUMENTS

| | | | | |
|---|---|---|---|---|
| 2002/0191678 | A1* | 12/2002 | Batra et al. ................... | 375/132 |
| 2003/0147453 | A1* | 8/2003 | Batra ............................. | 375/132 |
| 2004/0120424 | A1 | 6/2004 | Roberts | |
| 2006/0133543 | A1* | 6/2006 | Linsky et al. ................ | 375/341 |
| 2008/0219323 | A1* | 9/2008 | Desai ..................... | H04B 1/715 |
| | | | | 375/132 |
| 2012/0076173 | A1* | 3/2012 | Chang et al. ................. | 375/132 |

* cited by examiner

*Primary Examiner* — Chirag Shah
*Assistant Examiner* — Jenkey Van
(74) *Attorney, Agent, or Firm* — Winston Hsu; Scott Margo (57) ABSTRACT

A channel map generation method includes: performing a power spectrum density detection on a plurality of channels in a frequency band, to generate a first channel map; and performing a first smoothing operation on the first channel map by a first window size to generate a second channel map. The first smoothing operation includes: grouping channels of the first channel map into a plurality of channel groups according to the first window size; and according to the number of good channels or bad channels in each of the channel group, deciding to retain channel determinations in the first channel map of the channel group, or re-designating all the channels of the channel group, so as to generate the second channel map.

6 Claims, 9 Drawing Sheets

CHANNEL MAP GENERATION METHOD AND APPARATUS THEREFOR

BACKGROUND OF THE INVENTION

1. Field of the Invention

The present invention relates to a channel selection mechanism, and more particularly, to a method of determining a channel map according to power spectrum density (PSD) and an apparatus thereof.

2. Description of the Prior Art

For a wireless communications system, there are a variety of interference sources in the air, e.g. the interference from the background, the interference from electronic device(s), the interference from the same transmission band, the interference from adjacent transmission band(s), and/or the interference from other wireless communications system(s). Thus, a wireless router or abase station is generally configured to operate in a transmission band with less interference, to thereby have better transmission efficiency.

Figure 1:
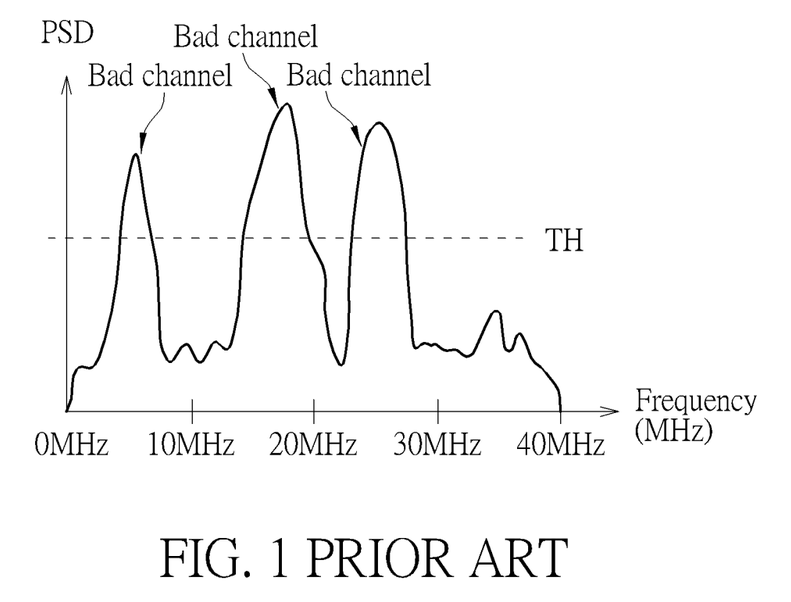
FIG. 1 shows an example of a conventional power spectrum density distribution.

For example, PSD is an index used to judge the energy scale of each band in the view of the spectrum, and can be used to determine the interference. In general, when the PSD value of a band is larger, it means that there is data transmission or interference source in the band. Please refer to FIG. 1, which shows an example of a conventional power spectrum density distribution. In FIG. 1, a threshold TH is used as a criterion for determining whether the PSD of a channel is too high. When the PSD of a channel exceeds the threshold TH, the channel will be viewed as a bad channel. That is, there is an interference source in the channel. Therefore, the bands with interference can be found through the power spectrum density detection technique. Next, the communications system avoids using these bad channels to improve the communications quality.

However, in order to reduce the cost of hardware, the PSD detection is usually performed by using the radio-frequency (RF) circuit of the communications apparatus, which makes the communications apparatus unable to perform data transmission. In other words, to achieve both of good communications quality and good transmission efficiency, the PSD detection has to be performed only in the period that the communications apparatus does not perform data transmission. Thus, the number of times of performing PSD detection is limited due to limited time periods. Besides, since the interference signals may appear or disappear with time, the PSD detection result might not exactly reflect the power spectrum density of the interference signals.

Thus, there is a need for a channel selection method which allows the PSD detection technique to correctly determine the bands with interference in a wireless local area network (WLAN), so as to improve the transmission quality and transmission rate by avoiding these bands with interference.

SUMMARY OF THE INVENTION

It is therefore one objective of the present invention to provide a method of determining a channel map according to the power spectrum density of channels and an apparatus thereof.

According to an embodiment of the present invention, an exemplary channel map generation method is disclosed. The channel map generation method includes the following steps: performing a power spectrum density detection on a plurality of channels in a frequency band, to generate a first channel map; and performing a first smoothing operation on the first channel map by a first window size to generate a second channel map. The first smoothing operation includes: grouping channels of the first channel map into a plurality of channel groups according to the first window size; and according to the number of good channels or bad channels in each of the channel group, deciding to retain channel determinations in the first channel map of the channel group, or re-designating all the channels of the channel group, so as to generate the second channel map.

According to another embodiment of the present invention, an exemplary channel map generation apparatus is disclosed. The channel map generation apparatus includes a power spectrum density detection circuit and a smoothing circuit. The power spectrum density detection circuit is arranged for performing a power spectrum density detection on a plurality of channels in a frequency band to generate a first channel map. The smoothing circuit is arranged for performing a first smoothing operation on the first channel map by a first window size and accordingly generating a second channel map, wherein the smoothing includes a grouping circuit and a channel determining circuit. The grouping circuit is arranged for grouping channels in the first channel map into a plurality of channel groups according to the first window size. The channel determining circuit is arranged for deciding to retain channel determinations in the first channel map of the channel group, or re-designating all the channels of the channel group, according to a number of good channels or bad channels in each of the channel group, so as to generate the second channel map.

Through the channel selection method and the apparatus thereof provided by the present invention, the PSD detection technique can correctly determine the bands with interference in a wireless local area network. Therefore, the wireless communications system using an adaptive hopping mechanism can maintain high transmission quality and high transmission rate by avoiding these bands with interference.

These and other objectives of the present invention will no doubt become obvious to those of ordinary skill in the art after reading the following detailed description of the preferred embodiment that is illustrated in the various figures and drawings.

DETAILED DESCRIPTION

Some phrases are referring to specific elements in the present specification and claims, please notice that the manufacturer might use different terms to refer to the same elements. However, the definition between elements is based on their functions instead of their names. Further, in the present specification and claims, the term "comprising" is open type and should not be viewed as the term "consisted of." Besides, the term "electrically coupled" can be referring to either directly connecting or indirectly connecting between elements. Thus, if it is described in the below contents of the present invention that a first device is electrically coupled to a second device, the first device can be directly connected to the second device, or indirectly connected to the second device through other devices or means.

Figure 2:
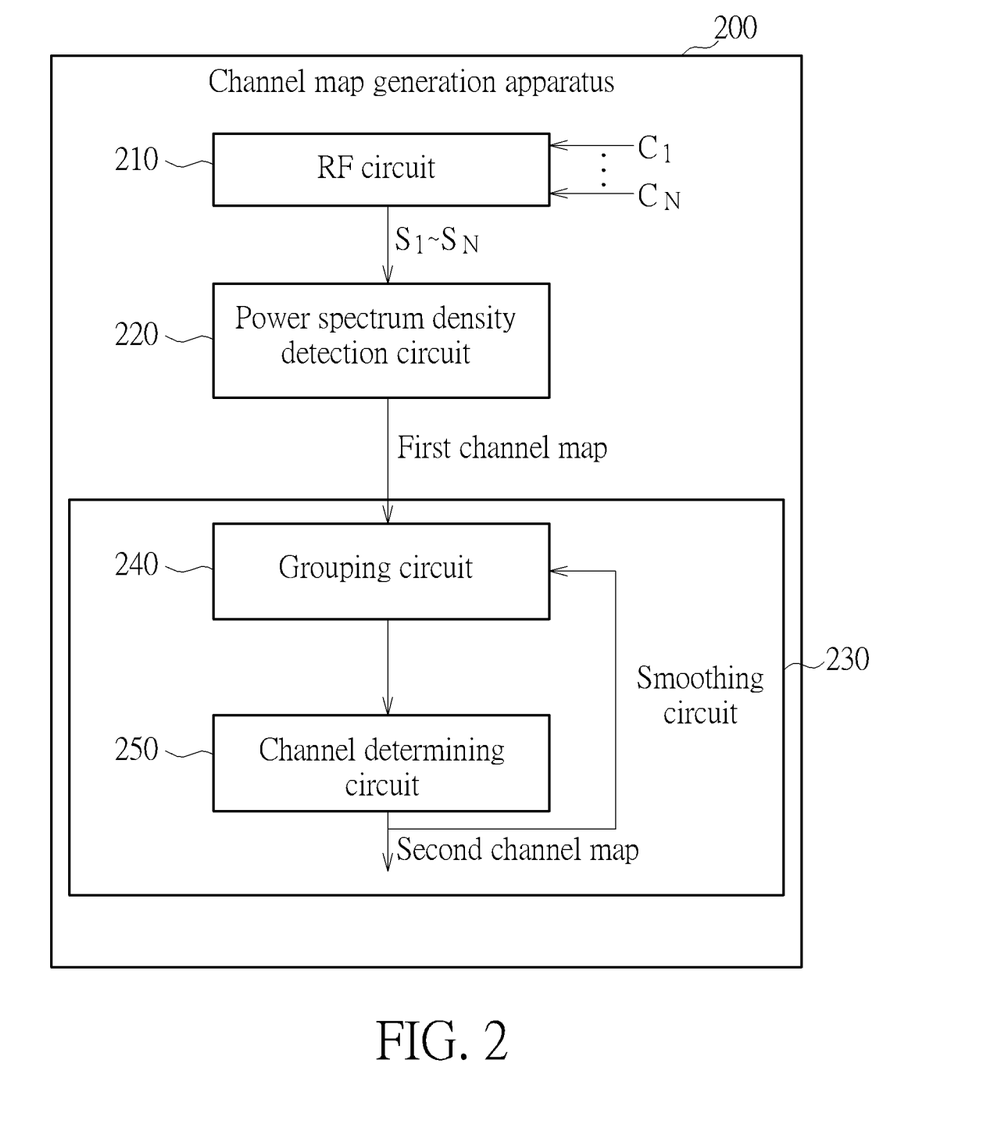
FIG. 2 is a block diagram illustrating a channel map generation apparatus according to an embodiment of the present invention.

Please refer to FIG. 2, which is a block diagram illustrating a channel map generation apparatus 200 according to an embodiment of the present invention. By way of example, but not limitation of the present invention, the channel map generation apparatus 200 may be used in a wireless communications system supporting an adaptive frequency hopping (AFH) mechanism, such as Bluetooth (BT) communications system. In other words, the channel map generation apparatus 200 is part of the wireless communications system. In this embodiment, the channel map generation apparatus 200 includes a radio-frequency (RF) circuit 210, a baseband signal processing circuit (e.g., a power spectrum density detection circuit 220) and a smoothing circuit 230. The smoothing circuit 230 includes a grouping circuit 240 and a channel determining circuit 250. The RF circuit 210 is used to receive wireless signals respectively from a plurality of channels $C_1$-$C_N$, to generate a plurality of received signals $S_1$-$S_N$. The power spectrum density detection circuit 220 is used to calculate a plurality of channel status indices $PSD_1$-$PSD_N$ respectively corresponding to channels $C_1$-$C_N$ according to the received signals $S_1$-$S_N$, thus generating a first channel map. Then, the smoothing circuit 230 performs a smoothing operation on the first channel map. In the smoothing circuit 230, the grouping circuit 240 is used to group channels in the first channel map into a plurality of channel groups according to a first window size. The channel determining circuit 250 further refers to the number of good channels or bad channels in each of the channel group, deciding to retain channel determinations in the first channel map of the channel group, or re-designating the channels of the channel group, so as to generate the second channel map.

Figure 3A:
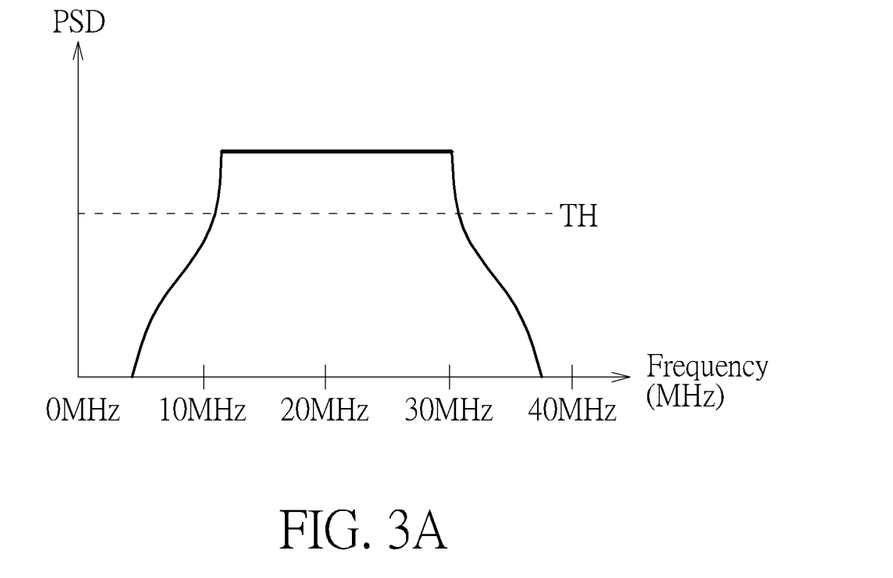
FIG. 3A shows a power spectrum density distribution in the real environment.
Figure 3B:
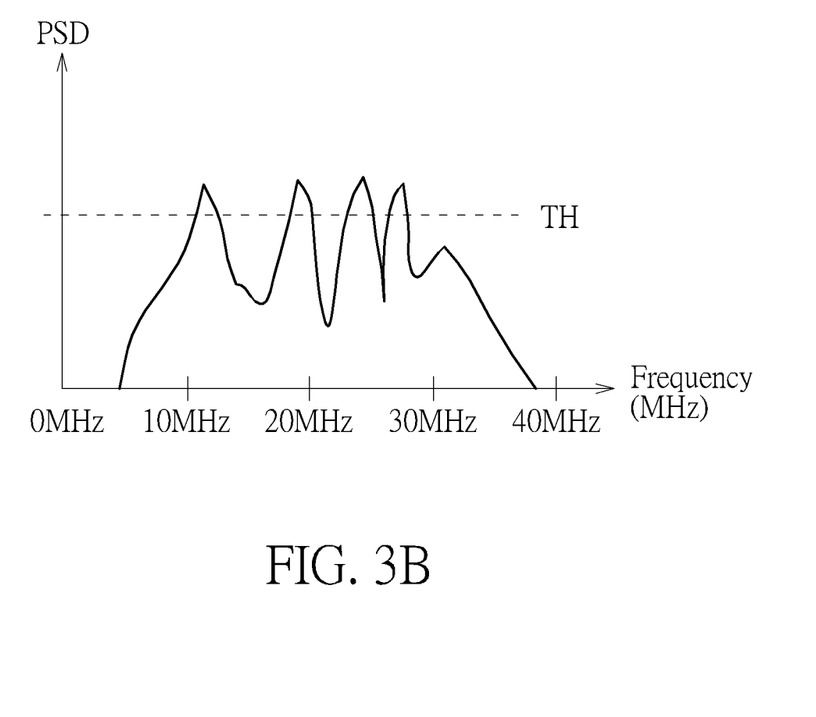
FIG. 3B shows a power spectrum density distribution detected by the RF circuit in FIG. 2 in the same real environment.

Please refer to FIGS. 3A and 3B. FIG. 3A shows an actual power spectrum density distribution in the real environment. FIG. 3B shows a power spectrum density distribution detected by the RF circuit 210 in FIG. 2 in the same real environment. As can be seen from FIGS. 3A and 3B, since the RF circuit 210 can merely utilize the spare time between data transmission and data reception to detect the power spectrum density, the detected power spectrum density may be deviated from the actual power spectrum density. The width of each channel is 1 MHz. The power spectrum density detection circuit 220 distinguishes between good channels and bad channels based on a threshold TH. If the power spectrum density of a channel is higher than the threshold TH, the channel will be determined as a bad channel. Otherwise, the channel will be determined as a good channel.

Figure 4:
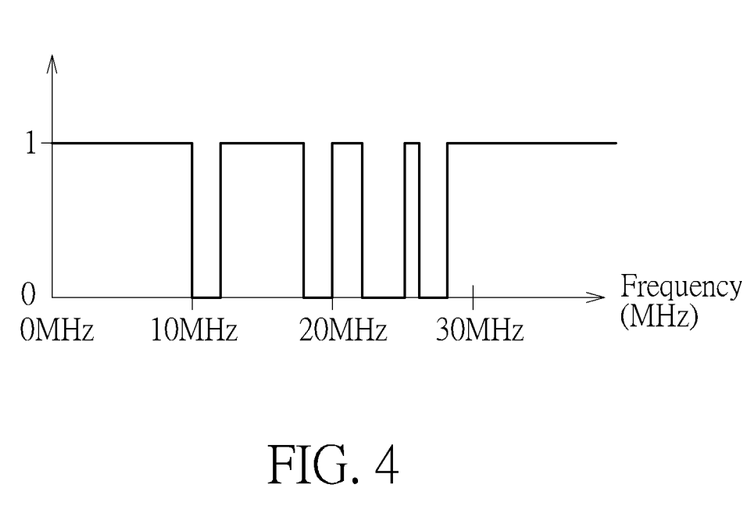
FIG. 4 shows a channel map of the power spectrum density distribution in FIG. 3B.

Please refer to FIG. 4, which shows a channel map of the power spectrum density distribution in FIG. 3B. In FIG. 4, the power spectrum density detection has been performed and the channel determinations of each channel are generated, the good/bad tags of the 40 channels from 0 MHz to 40 MHz are shown as a sequence of numbers: 11111-11111-00111-11100-11000-10011-11111-11111. The number "1" represents a good channel, and the number "0" represents a bad channel. Then, the grouping circuit 240 selects a channel width for each channel group. In this embodiment, the channel width for each channel group is selected as 5 MHz, and the step size of moving the channel selection window is also 5 MHz. Hence, the 40 channels are grouped into 8 channel groups corresponding to 0-5 MHz, 5-10 MHz, 10-15 MHz, 15-20 MHz, 20-25 MHz, 25-30 MHz, 30-35 MHz and 35-40 MHz, respectively. If presented in a sequence of numbers, the first to the eighth channel groups are 11111, 11111, 00111, 11100, 11000, 10011, 11111 and 11111, respectively. The channel determining circuit 250 refers to a number of the good/bad channels in each channel group to decide whether the channel determinations in the channel group of the first channel map should be retained, or good/bad tags of all the channels in the channel group should be re-designated, to generate the second channel map.

Figure 5:
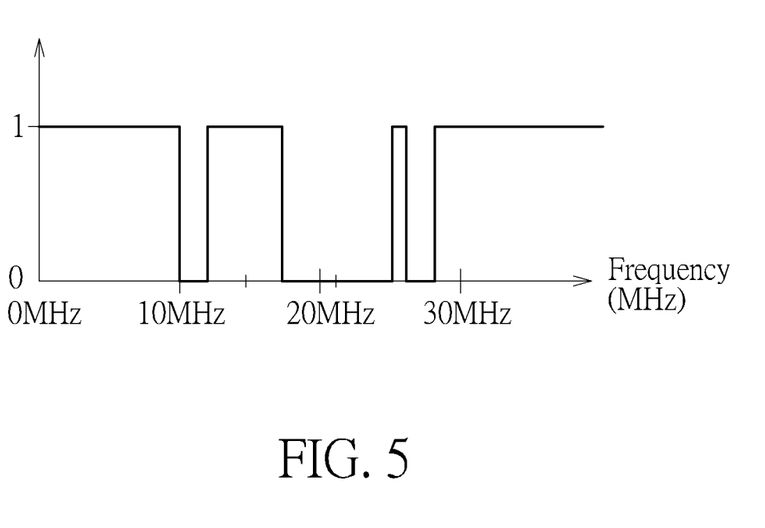
FIG. 5 shows a second channel map.

Please refer to FIG. 4 in conjunction with FIG. 5. Consider a case where the channel determining circuit 250 sets a good channel threshold by 3, and performs the first smoothing operation. Since there are only 2 good channels in the fifth channel group (20-25 MHz), the channel determining circuit 250 will designate all channels in the fifth channel group as "0", thus generating the second channel map as shown in FIG. 5. It can be seen from FIGS. 4 and 5 that, after the first smoothing operation is done, the twentieth and twenty-first channels previously determined as good channels in FIG. 4 are now re-designated as bad channels in FIG. 5. In this embodiment, the channel width (i.e., the first window size) of each channel group and the step size of moving the channel selection window used by the grouping circuit 240 are identical to each other. However, in other embodiments of the present invention, the channel width of each channel group is not required to be identical to the step size of moving the channel selection window, which will be discussed later. In this embodiment, the present invention determines to re-designate good/bad tags of all the channels in a channel group if the number of good channels in the channel group is less than a good channel threshold. In other embodiments, a bad channel threshold may be designed. Hence, the present invention may determine to re-designate good/bad tags of all the channels in a channel group if the number of bad channels in the channel group is more than the bad channel threshold.

Figure 6:
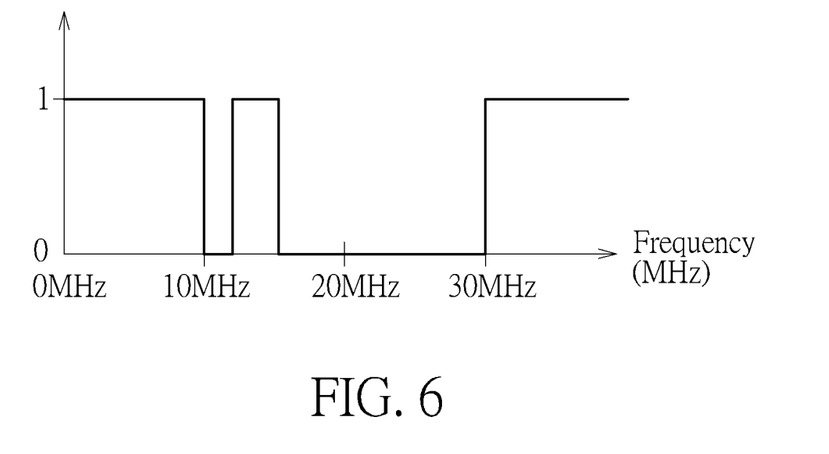
FIG. 6 shows a third channel map.

Then, the grouping circuit 240 uses 10 MHz as a second window size, but still uses 5 MHz as the step size of moving the channel selection window. In this way, the channels in 0 MHz-40 MHz are grouped into 7 channel groups corresponding to 0-10 MHz, 5-15 MHz, 10-20 MHz, 15-25 MHz, 20-30 MHz, 25-35 MHz and 30-40 MHz, respectively. If presented in a sequence of numbers, the first to the seventh channel groups are 1111111111, 1111100111, 0011111100, 1110000000, 0000010011, 1001111111 and 1111111111, respectively. The good channel threshold of the second smoothing operation is selected as 4 by the channel determining circuit 250. Because the number of good channels in the fourth channel group corresponding to 15-25 MHz (1110000000) and the number of good channels in the fifth channel group corresponding to 20-30 MHz (0000010011) are both less than 4, the channel determining circuit 250 will re-designate all channels in the fourth and fifth channel groups as "0" to thereby generate a third channel map, as shown in FIG. 6. The third channel map shows 11111-11111-00111-00000-00000-00000-11111-11111 from 0 MHz to 40 MHz. It can be seen from FIGS. 5 and 6 that, by means of the second-round filtering, the sixteenth, seventeenth, eighteenth, twenty-sixth, twenty-ninth and thirtieth channels previously determined as good channels are now re-designated as bad channels.

Figure 7:
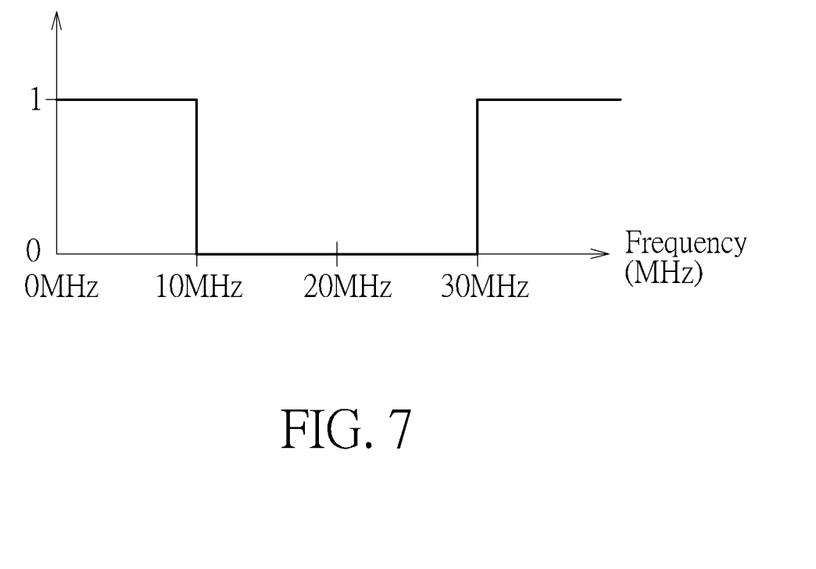
FIG. 7 shows a fourth channel map.

Then, the grouping circuit 240 uses 20 MHz as a third window size, but still uses 5 MHz as the step size of moving the channel selection window. In this way, the channels in 0 MHz-40 MHz are grouped into 5 channel groups corresponding to 0-20 MHz, 5-25 MHz, 10-30 MHz, 15-35 MHz and 20-40 MHz, respectively. If presented in a sequence of numbers, the first to the fifth channel groups are 1111111110011100000, 11111001110000000000, 00111000000000000000, 00000000000000011111 and 00000000001111111111, respectively. The good channel threshold of the third smoothing operation is still selected as 4 by the channel determining circuit 250. Because the number of good channels in the third channel group corresponding to 10-30 MHz (00111000000000000000) is less than 4, the channel determining circuit 250 will designate all channels in the third group as "0", thus generating a fourth channel map, as shown in FIG. 7. The fourth channel map shows 11111-11111-00000-00000-00000-11111-11111 from 0 MHz to 40 MHz. It can be seen from FIGS. 6 and 7 that, by means of the third-round filtering, the thirteenth, fourteenth and fifteenth channels are previously determined as good channels, but are now re-designated as bad channels.

Please refer to FIGS. 3A, 3B and 7. It can be seen from FIG. 3A that the interference signal occurs in the band of 10 MHz-30 MHz, but the power spectrum density distribution detected by the RF circuit 210 and shown in FIG. 3B does not correctly reflect the real situation shown in FIG. 3A. However, as illustrated in FIG. 7, the channel map generation apparatus 200 can precisely determine channels interfered with noise, e.g. the channels in the window size from 10 MHz to 30 MHz. Therefore, the situation that channel map generation apparatus 200 assigns channels interfered with noise as selectable channels in the channel map can be avoided, thus ensuring the communications quality and transmission efficiency of the channel map generation apparatus 200. In the aforementioned exemplary embodiment, the smoothing operation is performed for three times. However, this is for illustrative purposes only, and the present invention is not limited thereto. The number of times of performing the smoothing operation may be increased or decreased, depending on actual needs. After generates the final channel map, the wireless communications system may uses the final channel map to transfer or receive date with other device.

Figure 8:
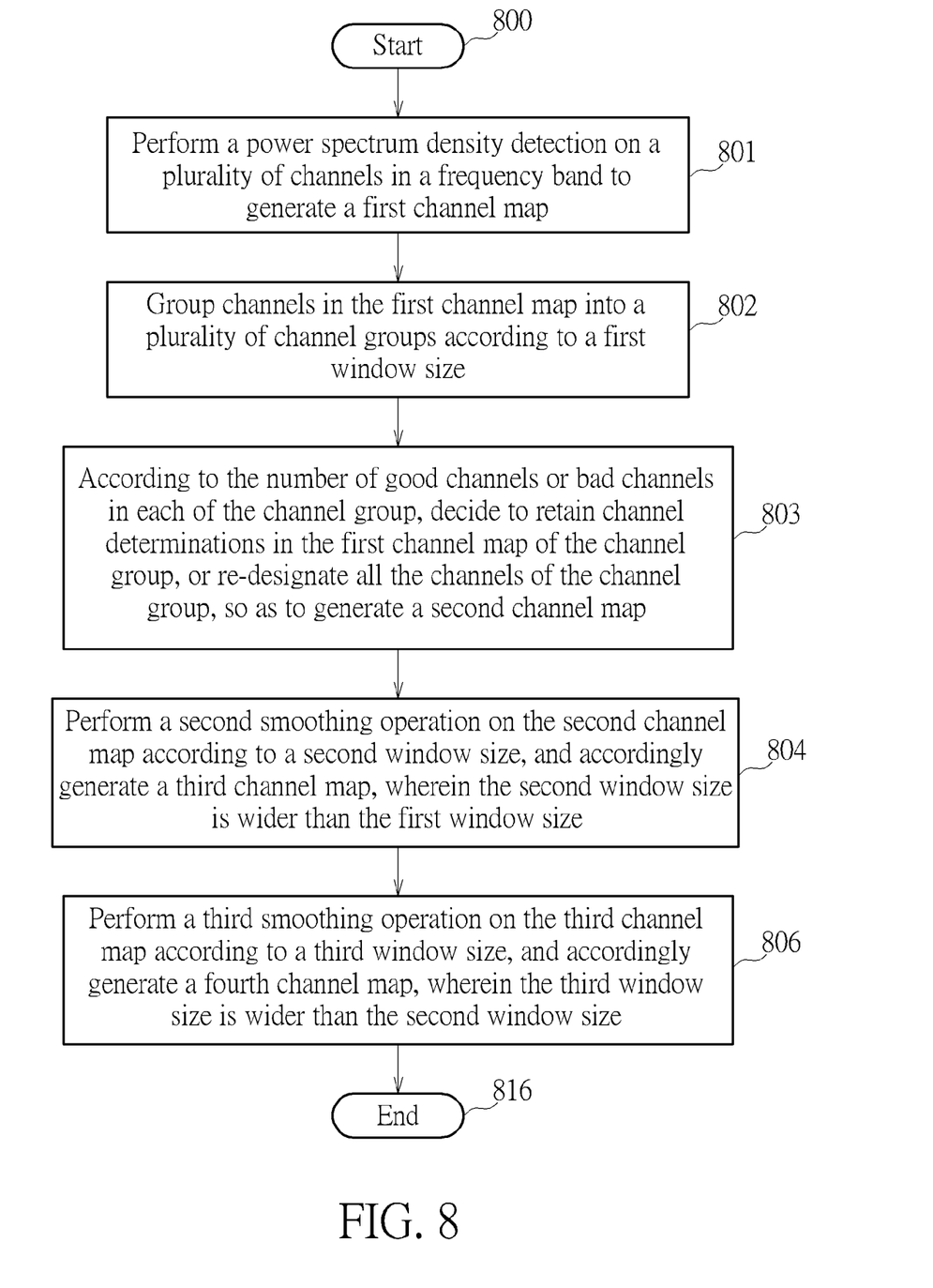
FIG. 8 is a flowchart illustrating a channel selection method according to an embodiment of the present invention.

Please refer to FIG. 8, which is a flowchart illustrating a channel selection method according to an embodiment of the present invention. If the result is substantially the same, the steps are not required to be executed in the exact order shown in FIG. 8. The exemplary method shown in FIG. 8 may be employed by the channel map generation apparatus 200 in FIG. 2, and may be briefly summarized as follows.

Step 800: Start;

Step 801: Perform a power spectrum density detection on a plurality of channels in a frequency band to generate a first channel map;

Step 802: Group channels in the first channel map into a plurality of channel groups according to a first window size;

Step 803: according to the number of good channels or bad channels in each of the channel group, decide to retain channel determinations in the first channel map of the channel group, or re-designate all the channels of the channel group, so as to generate a second channel map;

Step 804: Perform a second smoothing operation on the second channel map according to a second window size, and accordingly generate a third channel map, wherein the second window size is wider than the first window size;

Step 806: Perform a third smoothing operation on the third channel map according to a third window size, and accordingly generate a fourth channel map, wherein the third window size is wider than the second window size;

Step 816: end.

As one skilled in the art can readily understand details of each step shown in FIG. 8 after reading above paragraphs directed to the channel map generation apparatus 200, further description is omitted here for brevity.

In short, the present invention utilizes the spare time during data transmission and data reception to detect the power spectrum density (PSD), and performs further filtering on a channel map derived from the PSD detection result for filtering out channels which are possibly interfered with interference sources to reflect the real situation. In this way, high communications quality and transmission efficiency are achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A channel map generation method, comprising:

performing a power spectrum density detection on a plurality of channels in a frequency band, to generate a first channel map;

performing a first smoothing operation on the first channel map by a first window size to generate a second channel map, wherein the first smoothing operation comprises:

grouping channels of the first channel map into a plurality of channel groups according to the first window size, wherein window sizes of the channel groups are the same; and according to the number of good channels or bad channels in each of the respective channel groups of the first channel map, deciding to retain channel determinations in the respective channel group of the first channel map, or re-designating all the channels in the respective channel group of the first channel map, so as to generate the second channel map; and performing a second smoothing operation on the second channel map by a second window size and accordingly generating a third channel map, wherein the second smoothing operation comprises:

grouping channels of the second channel map into a plurality of channel groups according to the second window size, wherein window sizes of the channel groups of the second channel map are the same; and according to the number of good channels or bad channels in each of the respective channel groups of the second channel map, deciding to retain channel determinations in the respective channel group of the second channel map, or re-designating all the channels in the respective channel group of the second channel map, so as to generate the third channel map, wherein the second window size is wider than the first window size; and wherein, for each channel group in the first and second channel maps, re-designating all channels in the respective channel group as bad channels according to a number of good channels in the respective channel group being less than a good channel threshold or a number of bad channels in the respective channel group being more than a bad channel threshold.

2. The channel map generation method of claim 1, further comprising:
performing a third smoothing operation on the third channel map by a third window size and accordingly generating a fourth channel map, wherein the third window size is wider than the second window size.

3. A channel map generation apparatus, comprising:
a power spectrum density detection circuit, arranged for performing a power spectrum density detection on a plurality of channels in a frequency band to generate a first channel map;
a smoothing circuit, arranged for performing a first smoothing operation on the first channel map by a first window size and accordingly generating a second channel map, wherein the smoothing circuit comprises:
  a grouping circuit, arranged for grouping channels in the first channel map into a plurality of channel groups according to the first window size, wherein window sizes of the channel groups are the same; and
a channel determining circuit, arranged for deciding to retain channel determinations in each of the respective channel groups of the first channel map, or re-designating all the channels in the respective channel group of the first channel map, according to a number of good channels or bad channels in each of the respective channel groups of the first channel map, so as to generate the second channel map;
wherein the smoothing circuit further performs a second smoothing operation on the second channel map by a second window size and accordingly generates a third channel map; and the second smoothing operation comprises:
  grouping channels of the second channel map into a plurality of channel groups according to the second window size, wherein window sizes of the channel groups of the second channel map are the same; and
  according to the number of good channels or bad channels in each of the respective channel groups of the second channel map, deciding to retain channel determinations in the respective channel group of the second channel map, or re-designating all the channels in the respective channel group of the second channel map, so as to generate the third channel map, wherein the second window size is wider than the first window size; and
wherein the channel determining circuit decides, for each channel group in the first and second channel maps, whether to re-designate all channels in the respective channel group as bad channels according to a number of good channels in the respective channel group being less than a good channel threshold or a number of bad channels in the respective channel group being more than a bad channel threshold.

4. The channel map generation apparatus of claim 3, wherein the smoothing circuit further performs a third smoothing operation on the third channel map by a third window size and accordingly generates a fourth channel map.

5. The channel map generation apparatus of claim 4, wherein the third window size is wider than the second window size.

6. A channel map generation apparatus, comprising:
a power spectrum density detection circuit, arranged for performing a power spectrum density detection on a plurality of channels in a frequency band to generate a first channel map;
a smoothing circuit, arranged for performing a first smoothing operation on the first channel map by a first window size and accordingly generating a second channel map, wherein the smoothing circuit comprises:
  a grouping circuit, arranged for grouping channels in the first channel map into a plurality of channel groups according to the first window size, wherein window sizes of the channel groups are the same; and
a channel determining circuit, arranged for deciding to retain channel determinations in each of the respective channel groups of the first channel map, or re-designating all the channels in the respective channel group of the first channel map, according to a number of good channels or bad channels in each of the respective channel groups of the first channel map, so as to generate the second channel map;
wherein the smoothing circuit further performs a second smoothing operation on the second channel map by a second window size and accordingly generates a third channel map; and the second smoothing operation comprises:
  grouping channels of the second channel map into a plurality of channel groups according to the second window size, wherein window sizes of the channel groups of the second channel map are the same; and
  according to the number of good channels or bad channels in each of the respective channel groups of the second channel map, deciding to retain channel determinations in the respective channel group of the second channel map, or re-designating all the channels in the respective channel group of the second channel map, so as to generate the third channel map, wherein the second window size is wider than the first window size; and
wherein, for each channel group in the first and second channel maps, re-designating all channels in the respective channel group as bad channels according to a comparison of a number of good channels in the respective channel group and a good channel threshold or a comparison of a number of bad channels in the respective channel group and a bad channel threshold.

* * * * *